Patented May 6, 1924.

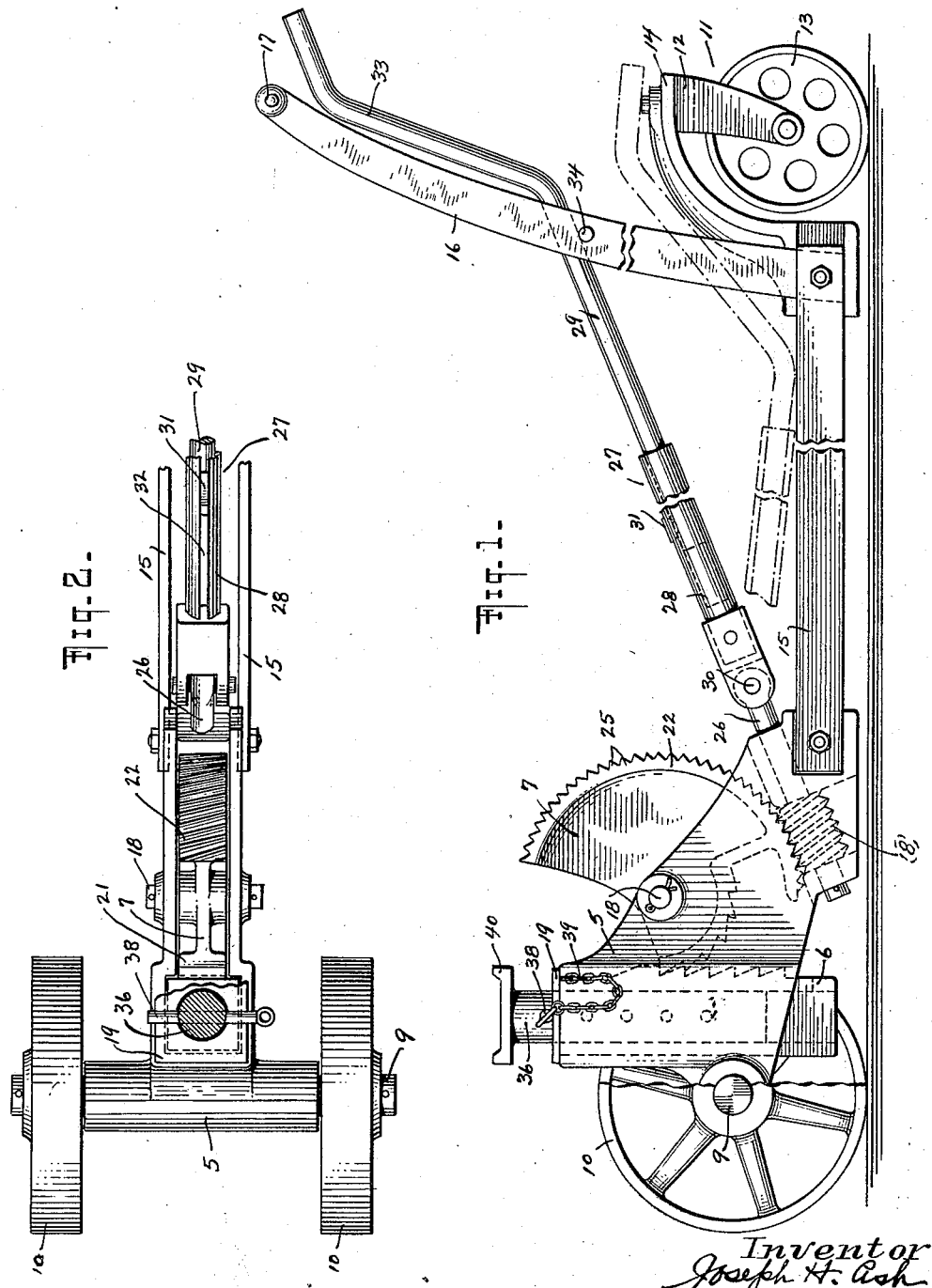

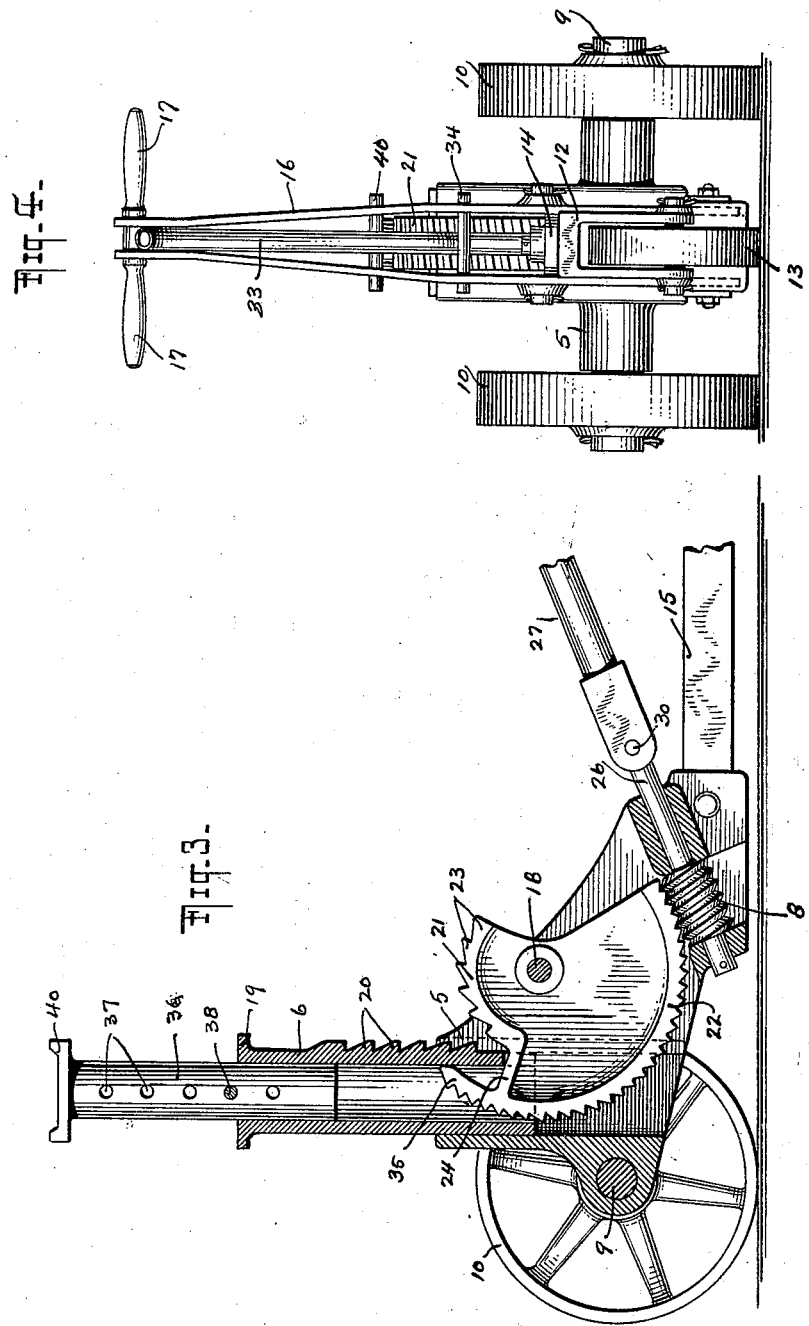

1,492,826

UNITED STATES PATENT OFFICE.

JOSEPH H. ASH, OF BUFFALO, NEW YORK.

AUTOMOBILE JACK.

Application filed August 6, 1921. Serial No. 490,302.

*To all whom it may concern:*

Be it known that I, JOSEPH H. ASH, a citizen of the United States of America, and a resident of the city of Buffalo, county of Erie, and State of New York, have invented certain new and useful Improvements in Automobile Jacks, of which the following is a full, clear, and exact description.

My invention relates generally to jacks and like lifting devices, and in particular to jacks designed for use in garages and repair shops whereby automobiles may be lifted and turned or moved as desired.

The principal object of my invention has been to provide a jack which shall have great lifting power; one easy and convenient to operate; and one compact in design, yet possessing a large range of initial lifting positions.

Another object has been to provide a jack which shall be strong and durable in its construction.

Furthermore, my jack may be operated from a standing posture and still be capable of swinging movement under the wheels of the automobile which it is supporting.

The above objects and advantages have been accomplished by the device shown in the accompanying drawings, of which:

Fig. 1 is a side elevation of my complete device, portions thereof being broken away for convenience of illustration.

Fig. 2 is a fragmentary, plan view of the same.

Fig. 3 is a fragmentary, sectional view taken through the longitudinal center of the jack and showing the parts in their elevated positions.

Fig. 4 is a front end elevation of my device.

My device comprises a body 5 which is provided with suitable openings and recesses for the reception of the rack bar 6, the gear member 7, and the worm 8. The body carries at its forward end a shaft 9, upon the outer projecting ends of which are mounted wheels 10. At the opposite end of the device is mounted a caster 11, which comprises a swivel 12 carrying a caster wheel 13. The swivel 12 is supported by means of a caster bracket 14. Connecting the body part 5 with the caster bracket 14 are two side members 15, which are preferably bolted in position. The side members are arranged below the axes of the supporting wheels, or are underslung, whereby the frame and operating shaft 27 with its sliding member 29 may be free to pass underneath the raised wheels of an automobile, while the jack is supporting the same. A standard 16 is supported by means of the bracket 14, and this standard is provided with suitable handles 17. By means of the standard, the jack may be moved about as desired. The body 5, side members 15, and the bracket 14 provide a supporting frame for the jack.

The rack bar 6 is slidably supported in the body 5, and is provided at one side with a plurality of teeth 20. The rack bar is provided with a shoulder 19, which engages with the body 5 when the device is in its lowermost position, thus acting as a stop to limit the downward movement of the bar. The gear member 7 is pivotally mounted upon a pin 18, carried by the body 5, and is provided with two segmental gears 21 and 22. The segmental gear 21 preferably has a radius considerably less than the radius of the segmental gear 22. The segmental gear 21 is provided with teeth 23, which are engageable with the teeth 20 of the rack bar 6. The gear member 7 is provided with a shoulder 24 which is preferably arranged at a point where the segmental gear 21 terminates. The rack bar 6 is preferably hollow throughout its central portion, and this shoulder comes into engagement with the lower end of this bar, when the last tooth 23 of the segmental gear 21 has passed out of engagement with the last tooth 20 of the rack bar. The segmental gear 22 is provided with a portion 35 which projects beyond the shoulder 24, and contacts with the inner face of the rack bar 6, when the bar has been moved to the upper limit of its travel, whereby a stop is provided which prevents the bar from moving beyond its predetermined upper limit. This is clearly shown in Fig. 3 of the drawings. The segmental gear 22 is provided with teeth 25, which are arranged to engage with the worm 8. The worm is rigidly mounted upon a worm shaft 26, which is carried by the body 5. An operating shaft 27 is provided for rotating the worm shaft 26. This shaft comprises a sleeve member 28 and a slidable member 29. The sleeve member is pivotally united at its lower end with the worm shaft 26 by means of a pin 30. The slidable member 29 of the operating shaft is disposed within the sleeve member 28 and carries a key 31 which is engageable with a slot 32 formed in the sleeve member. By this arrangement the slidable member may telescope with the sleeve member, thus making the device very compact and easy to operate. The slidable member 29 is provided at its outer end with a crank 33, whereby the shaft may be operated. A removable pin 34 is carried by the standard 16, whereby the operating shaft may be held in its operable position as shown in Fig. 1. When it is desired to move the operating shaft out of the way, the pin 34 is withdrawn, whereupon the shaft may be telescoped and lowered to the position shown by the dotted lines in Fig. 1. The shape of the crank 33 and the lengths of the members 28 and 29 of the operating shaft are such that the shaft will be moved to the lowest possible position, thus permitting the jack to be moved around underneath the wheels of the car it is supporting.

The rack bar, as hereinbefore stated, is provided with a central opening, in which a saddle post 36 is disposed. This post is provided with a plurality of lateral apertures 37, with any one of which the pin 38 may be engaged. The pin is preferably secured to the device by means of a chain 39. The saddle post carries a saddle 40 at its upper end.

Obviously, some modifications of the details herein shown and described may be made without departing from the spirit of my invention or the scope of the appended claims; and I do not, therefore, wish to be limited to the exact embodiment herein shown and described, the form described being merely a preferred embodiment thereof.

Having thus described my invention, what I claim is:

1. A jack characterized by having a body, wheels for the body, a rack bar slidably carried by the body, a segmental gear for the rack bar, an operating segmental gear movable with the rack segmental gear, means for rotating the operating segmental gear, and a shoulder carried by the operating gear and engageable with the rack bar, whereby the rack bar is limited in its upward travel.

2. A jack characterized by having a body, wheels for the body, a hollow rack bar slidably carried by the body, a segmental gear for the rack bar, an operating segmental gear movable with the rack segmental gear, means for rotating the operating segmental gear, and a shoulder carried by the operating segmental gear and arranged below its forward end, whereby a stop is provided for the rack bar.

In testimony whereof, I have hereunto signed my name.

JOSEPH H. ASH.